US010724589B2

(12) United States Patent
Baumgartner et al.

(10) Patent No.: US 10,724,589 B2
(45) Date of Patent: Jul. 28, 2020

(54) BRAKE PAD RETENTION SYSTEM OF A DISC BRAKE OF A MOTOR VEHICLE (71) Applicant: KNORR-BREMSE Systeme fuer Nutzfahrzeuge GmbH, Munich (DE)

(72) Inventors: Johann Baumgartner, Moosburg (DE); Michael Peschel, Schoengeising (DE); Alexander Werth, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 534 days.

(21) Appl. No.: 14/454,893

(22) Filed: Aug. 8, 2014

(65) Prior Publication Data
US 2014/0345983 A1 Nov. 27, 2014

Related U.S. Application Data (63) Continuation of application No. PCT/EP2013/052276, filed on Feb. 6, 2013.

(30) Foreign Application Priority Data

Feb. 10, 2012 (DE) .......................... 10 2012 002 734

(51) Int. Cl.
*F16D 65/097* (2006.01)
*F16D 55/02* (2006.01)
*F16D 55/226* (2006.01)

(52) U.S. Cl.
CPC ......... *F16D 65/0978* (2013.01); *F16D 55/02* (2013.01); *F16D 55/226* (2013.01); *F16D 65/0976* (2013.01)

(58) Field of Classification Search
CPC .. F16F 65/0006; F16F 65/097; F16F 65/0973; F16F 65/0974; F16F 65/0977; F16F 65/0978
See application file for complete search history.

(56) References Cited

U.S. PATENT DOCUMENTS 3,363,727 A * 1/1968 Thirion ................. F16D 55/226
188/205 R
3,368,647 A * 2/1968 Laverdant ........... F16D 55/2262
188/73.39
(Continued)

FOREIGN PATENT DOCUMENTS

CN 1384904 12/2002
DE 6938649 U 3/1970
(Continued)

OTHER PUBLICATIONS

International Search Report dated Aug. 26, 2013 with English translation (five (5) pages).
(Continued)

*Primary Examiner* — Robert A. Siconolfi
(74) *Attorney, Agent, or Firm* — Crowell & Moring LLP (57) ABSTRACT A brake pad retention system is provided for a disc brake of a motor vehicle, in particular of a commercial vehicle. The disc brake includes a brake caliper which engages over a brake disc, a brake carrier which is positionally fixed on the vehicle, the brake carrier having entry-side and exit-side carrier horns and having a bridge which connects the carrier horns to one another, and at least one brake pad which is provided with a pad carrier plate and a friction pad fastened thereto and which is guided in a pad shaft formed by the carrier horns and by the bridge. At least one of the carrier horns of the carrier and the support surface, adjacent thereto, of the pad carrier plate can be fixed to one another in a positively locking manner with play. The at least one brake pad is held in the pad shaft under spring loading exerted by a pad retention spring which extends transversely with respect to the axial direction of the brake disc and which is radially deflectable on the brake pad. The at least one pad retention spring is arranged such that the pad retention (Continued)

spring, in the assembled state, presses the brake pad away from the bridge part of the brake carrier and against the carrier horns without play.

10 Claims, 6 Drawing Sheets

(56) References Cited

U.S. PATENT DOCUMENTS

| | | | |
|---|---|---|---|
| 3,616,878 A | | 11/1971 | Girauldon |
| 3,773,149 A | | 11/1973 | Toshida et al. |
| 3,990,545 A | * | 11/1976 | Hoffmann ............ F16D 55/226 188/72.4 |
| 4,049,087 A | * | 9/1977 | Heinz ................ F16D 65/0978 188/73.38 |
| 4,881,623 A | | 11/1989 | Kondo |
| 5,609,228 A | | 3/1997 | Le Deit et al. |
| 6,286,636 B1 | | 9/2001 | Iwata |
| 6,293,373 B1 | | 9/2001 | Weiler et al. |
| 6,305,506 B1 | | 10/2001 | Shirai et al. |
| 6,527,090 B1 | | 3/2003 | Barillot et al. |
| 7,201,257 B2 | | 4/2007 | Nakajima et al. |
| 8,016,084 B2 | * | 9/2011 | Camilo-Martinez ........................ F16D 65/092 188/250 G |
| 8,220,595 B2 | * | 7/2012 | Camilo-Martinez ........................ F16D 65/0978 188/250 B |
| 8,235,184 B2 | | 8/2012 | Matsushima |
| 2009/0020380 A1 | | 1/2009 | Camilo-Martinez et al. |

FOREIGN PATENT DOCUMENTS

| | | | | |
|---|---|---|---|---|
| DE | 2 211 013 A | | 9/1973 | |
| DE | 2211013 A1 | * | 9/1973 | ........... F16D 55/224 |
| DE | 2255678 A1 | * | 5/1974 | ......... F16D 55/2262 |
| DE | 2454279 A1 | * | 5/1975 | ........... F16D 55/226 |
| DE | 38 00 537 A1 | | 7/1988 | |
| DE | 199 53 159 A1 | | 6/2000 | |
| DE | 10 2004 050 138 A1 | | 6/2005 | |
| DE | 11 2007 003 073 T5 | | 10/2009 | |
| EP | 0563689 A2 | * | 10/1993 | ......... F16D 65/0006 |
| EP | 2 088 346 A1 | | 8/2009 | |
| EP | 2 213 900 A1 | | 8/2010 | |
| EP | 2 088 346 B1 | | 10/2011 | |
| FR | 1 492 833 A | | 8/1967 | |
| FR | 2291412 A1 | * | 6/1976 | ......... F16D 55/2262 |
| FR | 2461161 A1 | * | 1/1981 | ........... F16D 65/092 |
| JP | 8-233000 A | | 9/1996 | |
| JP | 9-79296 | | 3/1997 | |
| JP | 2000-145835 A | | 5/2000 | |
| JP | 2010-270894 A | | 12/2010 | |
| TW | 290505 | | 11/1996 | |
| TW | 350010 | | 1/1999 | |
| TW | 201038836 A1 | | 11/2010 | |
| WO | WO 9424454 A1 | * | 10/1994 | ........... F16D 65/092 |

OTHER PUBLICATIONS

German Office Action dated Sep. 14, 2012 (seven (7) pages).
International Preliminary Report on Patentability (PCT/IB/326 & PCT/IB/373) dated Aug. 21, 2014, including English translation of Written Opinion (PCT/ISA/237) (seven (7) pages).
Chinese Office Action issued in corresponding Chinese Application No. 201380008546.5 dated Nov. 4, 2015 with English translations (9 pages).
Chinese Office Action issued in corresponding Chinese Application No. 201380008546.5 dated May 24, 2016 (7 pages).
Chinese-language Office Action issued in counterpart Chinese Application No. 201380008546.5 dated Dec. 8, 2016 with English translation (Eight (8) pages).
Japanese Office Action issued in counterpart Japanese Application No. 2014-556027 dated Nov. 1, 2016 with English-language translation (seven (7) pages).
Chinese-language Office Action issued in counterpart Taiwanese Application No. 102104181 dated May 2, 2017 with English translation (6 pages).

* cited by examiner

BRAKE PAD RETENTION SYSTEM OF A DISC BRAKE OF A MOTOR VEHICLE

CROSS REFERENCE TO RELATED APPLICATIONS

This application is a continuation of PCT International Application No. PCT/EP2013/052276, filed Feb. 6, 2013, which claims priority under 35 U.S.C. § 119 from German Patent Application No. 10 2012 002 734.6, filed Feb. 10, 2012, the entire disclosures of which are herein expressly incorporated by reference.

BACKGROUND AND SUMMARY OF THE INVENTION

The present invention relates to a brake pad retention system of a disc brake of a motor vehicle, in particular a commercial vehicle.

Numerous construction variants of such brake pad retention systems of disc brakes are known from the prior art.

The brake pads are generally guided in the pad shaft of a brake carrier and secured against a curved pad retention member on a brake caliper. The pad retention member extends over the brake carrier in the form of a pad retention spring. The pad retention spring presses the brake pad against the brake carrier with a force $F_F$. During a braking operation, the brake pad may move counter to the resilient force of the pad retention spring about a rotation point owing to the torque M transmitted to the brake pad, the rotation point being located in this instance in the region of an upper end of the outlet-side carrier horn of the brake carrier.

Since, as a result of the movement of the brake pad, torque may be transmitted to a thrust piece of the brake caliper and a threaded spindle which is arranged thereon, the rotation of the brake pad may lead to undesirable wear adjustment.

In order to prevent such a rotation movement, a positive-locking securement of the brake pad in a brake pad shaft formed by the carrier horns of the brake carrier and a bridge piece of the brake carrier that connects the carrier horns is also not expedient since production-related tolerances of the brake pads and the brake carrier require a minimum play.

An object of the present invention is to effectively prevent the above-described rotation of the brake pad during a braking operation.

This and other objects are achieved by a brake pad retention system of a disc brake of a motor vehicle. The disc brake includes a brake caliper which straddles a brake disc, a brake carrier which is fixed at a vehicle side and which has inlet-side and outlet-side carrier horns and a bridge portion connecting the carrier horns to each other, and at least one brake pad which is provided with a pad carrier plate and a friction pad secured thereto, and which is guided in a pad shaft formed by the carrier horns and the bridge portion. At least one of the carrier horns of the brake carrier and the support face of the pad carrier plate adjacent thereto are able to be fitted to each other in a positive-locking manner with play. At least one brake pad is retained in the pad shaft in a resiliently loaded state via a pad retention spring which extends transversely relative to the axial direction of the brake disc and which can be radially redirected on the brake pad. The at least one pad retention spring is arranged such that the pad retention spring in the assembled state presses the brake pad away from the bridge portion of the brake carrier in a play-free manner against the carrier horns.

A brake pad retention system which is constructed in this manner is distinguished above all in that the at least one pad retention spring is arranged between a side of the brake pad facing the bridge portion of the brake carrier and the bridge portion of the brake carrier in the pad shaft. The pad retention spring in the assembled state presses the brake pad in front of the bridge portion of the brake carrier away in a play-free manner against the carrier horns.

Owing to the arrangement of the pad retention springs, that they do not press the brake pad in the direction of the bridge portion of the brake carrier, but rather in an opposed radially outward direction. The brake pad is pressed directly into the positive-locking connection between the brake pad and brake carrier horn with the force $F_F$, whereby in the force-free state, that is to say, in a state in which no braking operation takes place, the brake pad is located radially outward in positive-locking connection with the brake carrier horns with, at the same time, the tolerance required for fitting and removing the brake pad in or out of the brake pad shaft being provided and a required thermal expansion compensation also being ensured. If a braking operation is now initiated, only a tilting of the brake pad in the region of the outlet-side carrier horn would be possible, which is, however, prevented by the friction force $F_R$ prevailing at the outlet-side brake carrier horn owing to the abutment of the brake pad side on the outlet-side brake carrier horn.

Owing to the abutment of the brake pad on the radially outer side of the positive-locking connection, when torque is introduced due to a braking operation, the rotation point of the brake pad is displaced from the outlet-side carrier horn toward the inlet-side carrier horn, whereby a rotation movement of the brake pad in a direction of a main rotation direction of the brake disc is effectively prevented.

According to advantageous developments, the pad retention spring is constructed as a leaf spring, a helical spring, a plate spring or as a rotary spring or torsion spring, which are all capable of retaining the brake pad in the brake-free state in positive-locking connection at the radially outer side of the carrier horns or of the brake pad.

According to an alternative embodiment, the pad retention system is constructed in such a manner that the pad retention spring is supported on a curved pad retention member which is secured to the brake caliper. The brake pad spring is constructed as a tension spring. With this arrangement, the brake pad can also be retained in positive-locking connection at the radially outer region of the carrier horns so that the desired action of rotation prevention in the event of braking is also effectively prevented with this arrangement.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the Figures, terms such as top, bottom, left, right, front, rear, etc., refer exclusively to the exemplary illustration and position, selected in the respective Figures, of the retention system, the brake carrier, the pad retention spring and the like. These terms are not intended to be understood to be limiting. In other words, as a result of various operating positions or the mirror-symmetrical configuration or the like, these references may change.

Figure 1:
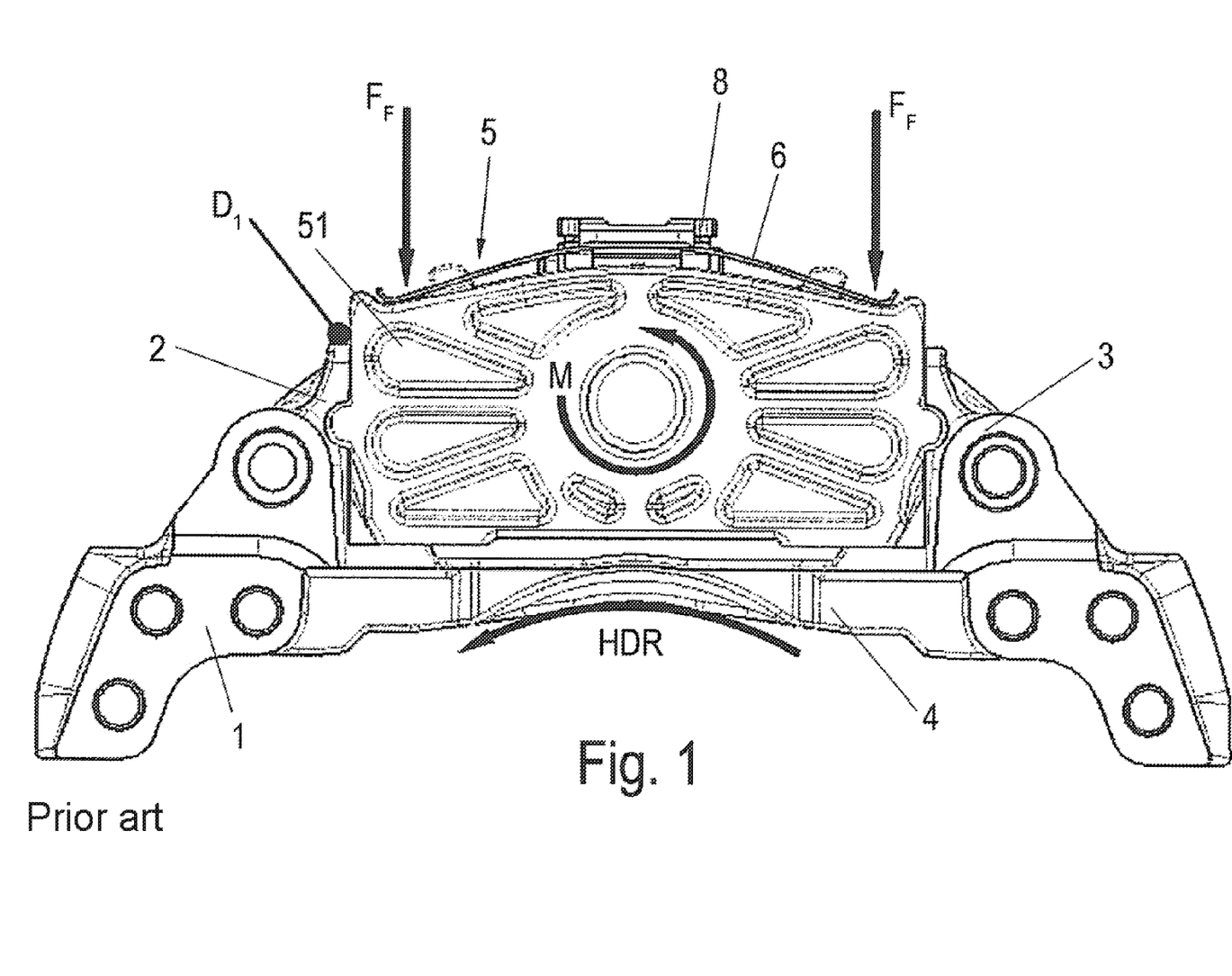
FIG. 1 is a front view of a pad retention system known from the prior art.

FIG. 1 is a front view of a pad retention system of a disc brake of a motor vehicle known from the prior art. The pad retention system has a brake carrier 1 having two carrier horns 2, 3 which are connected to each other by a bridge portion 4 and which together form a pad shaft 7 in which brake pads 5 can be positioned on both sides of an associated brake disc (not shown).

The brake pad 5 itself includes a brake pad carrier plate 51 and a friction pad (not illustrated), which friction pad faces the brake disc.

In the assembled state, the brake pads are retained in a fixed manner in a resiliently loaded state in the pad shaft 7 using a pad retention spring 6. The pad retention spring 6 is secured to a pad retention member 8 of the brake caliper (not shown) and presses the brake pad 5 with the resilient force $F_F$ against the brake carrier 1 in the direction of the carrier bridge 4.

If a braking operation is now initiated, the brake pad is pressed against the brake disc whereby, due to the rotation of the brake disc in a main rotation direction HDR, the brake pad moves counter to the resilient force of the pad retention spring and about a rotation point D which is located at the upper end of the outlet-side carrier horn 2. In order to prevent this rotation movement, a positive-locking connection of the brake pad 5 with the carrier horns 2, 3 of the brake carrier 1, for example, by formation of lateral protuberances on the pad carrier plate 51 and corresponding recesses at the inner sides of the carrier horns 2, 3 facing the brake pad 5, is also not sufficient since production-related tolerances of those components require a minimum play.

Figure 2:
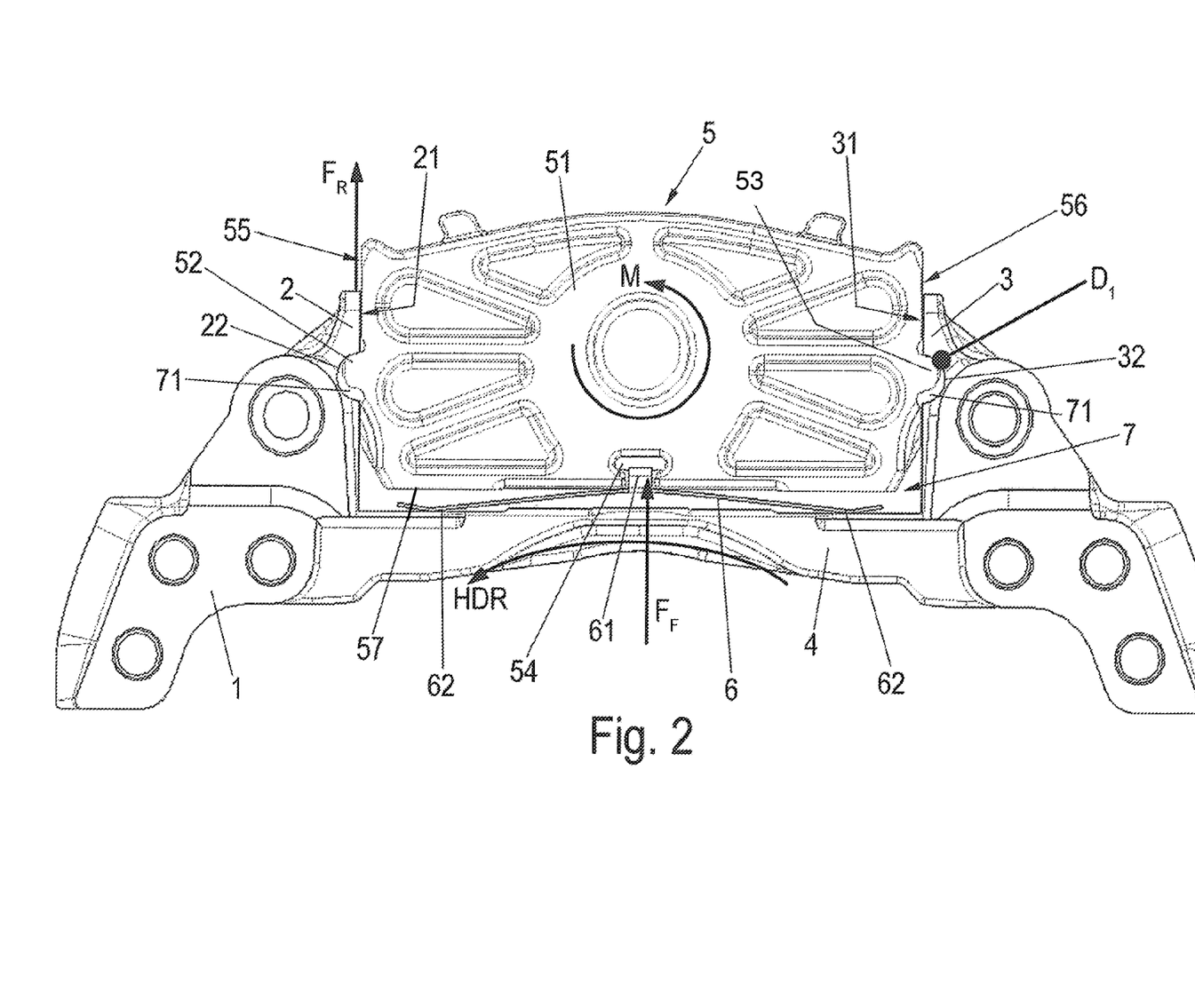
FIG. 2 is a front view of a first embodiment of a pad retention system according to the invention.

FIG. 2 shows a first preferred embodiment of a pad retention system of a motor vehicle according to the invention.

In contrast to the pad retention system shown in FIG. 1, the pad retention spring is arranged such that, in the assembled state, it presses the brake pad 5 away from the bridge portion 4 of the brake carrier 1 in a play-free manner against the carrier horns 2, 3.

In the construction variant illustrated in FIG. 2, the pad retention spring 6 is constructed as a leaf spring, which is retained centrally in a recess 54 at the side 57 of the pad carrier plate 51 of the brake pad 5 opposite the bridge portion 4, preferably by way of a curved retention member 61. The curved retention member engages around the pad retention spring 6 perpendicularly to the longitudinal extent thereof. The two end regions 62 of the pad retention spring 6 are supported on the upper side of the bridge portion 4 facing the brake pad and thereby press the brake pad 5 with the force $F_F$ with projections 52, 53 formed on the side faces 55, 56 of the pad carrier plate 51 against the radially outer edge of recesses 22, 32 at the inner sides 21, 31 of the carrier horns 2, 3 facing the brake pad 5.

The gap 71 which is produced by the upwardly pressed brake pad 5 between the lower side 57 of the brake pad and the upper side of the bridge portion 4 and between the region of the recesses 22, 32 close to the bridge portion 4 and the projections 52, 53 of the pad carrier plate 51 ensures the thermal expansion compensation required with such a pad retention system and the required tolerance for assembly and disassembly of the brake pad 5.

However, a significant advantage results owing to the brake pad being lifted in such a manner that the brake pad 5 is now in outward radial abutment with the recesses 22, 32 of the carrier horns 2, 3. As a consequence, a torque M which acts during a braking operation moves the rotation point D1 from the upper edge of the outlet-side carrier horn 2 (see FIG. 1) to the contact region of the projection 53 of the pad carrier plate 51 with the recess 32 of the inlet-side carrier horn 3 so that the brake pad 5 would be inclined in a radially inward direction owing to the torque M introduced at the outlet side of the brake pad 5. This is, however, prevented by the side face 55 of the brake pad 5 opposite the outlet-side carrier horn 2 being in abutment against the inner side 21 of the outlet-side carrier horn 2 facing the brake pad 5. Owing to the mutual abutment of these two sides 55 and 21, a friction force $F_R$ acts counter to the torque M so that, in this manner, a rotation movement of the brake pad 5 is effectively prevented during a braking operation.

Figure 3:
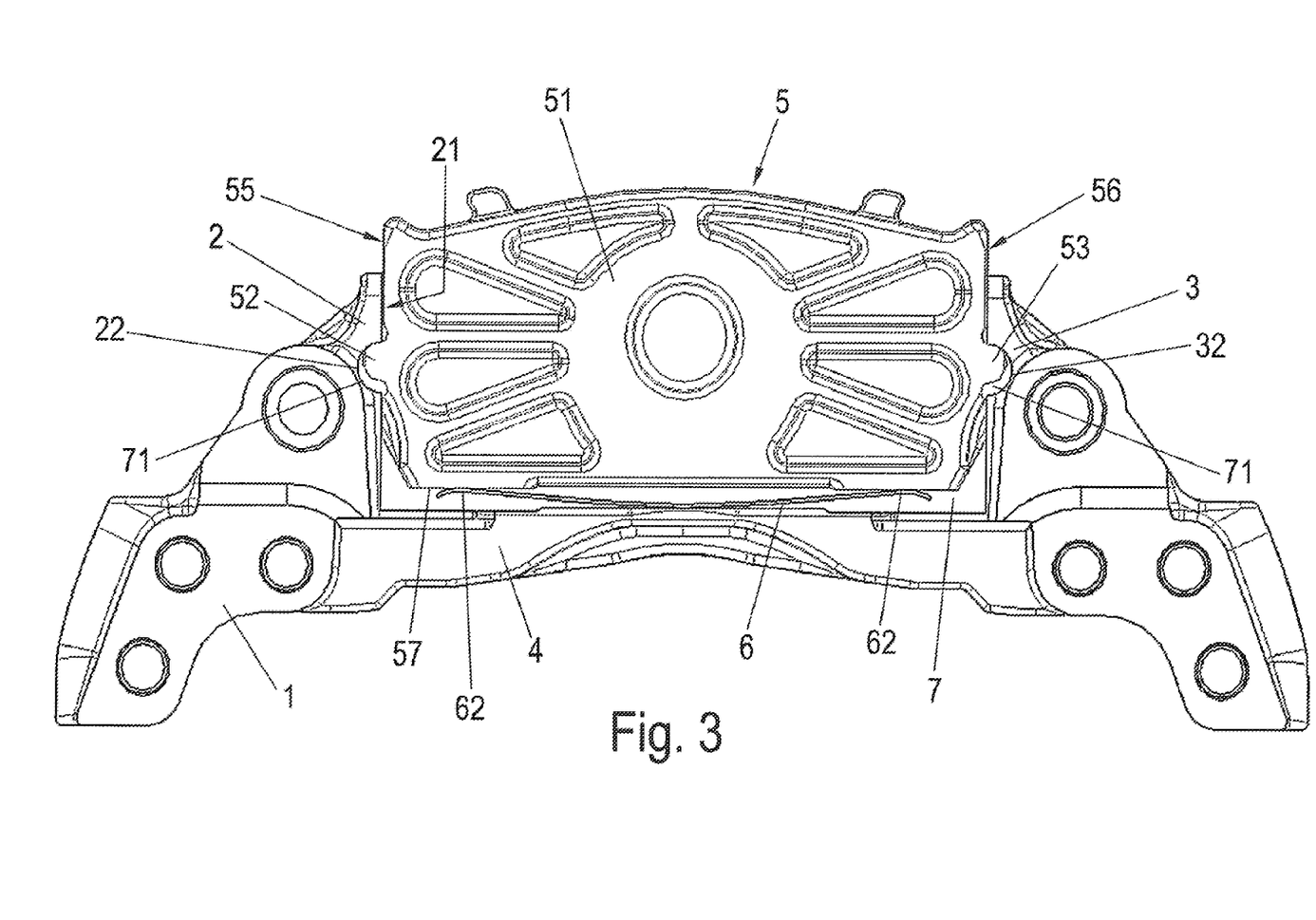
FIGS. 3 to 6 are additional front views of different embodiments of a pad retention system according to the invention.

In the embodiment of the pad retention system according to the invention illustrated in FIG. 3, the pad retention spring 6 is also constructed as a plate spring. However, the end regions 62 of the pad retention spring 6 are in abutment with the lower side 57 of the brake pad 5 and the central region of the pad retention spring which is constructed as a leaf spring is supported on the bridge portion 4.

Figure 4:
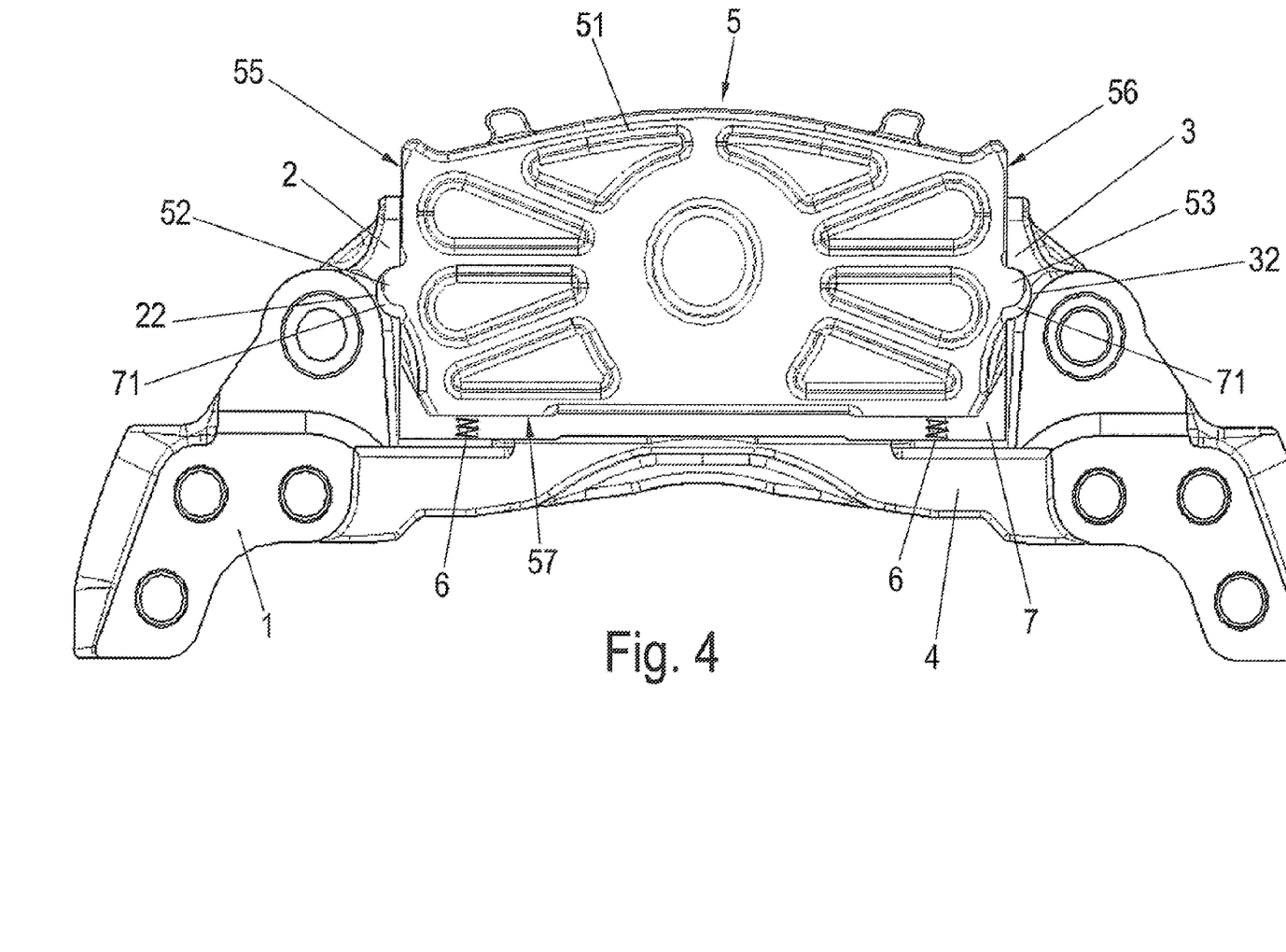

In the embodiment of the pad retention system according to the invention illustrated in FIG. 4, the pad retention spring is constructed as a helical spring, there preferably being provided for each of the brake pads 5 two such helical springs. The helical springs press the brake pad 5 upward against the bridge portion 4 into the positive-locking connection with the carrier horns 2, 3.

Figure 5:
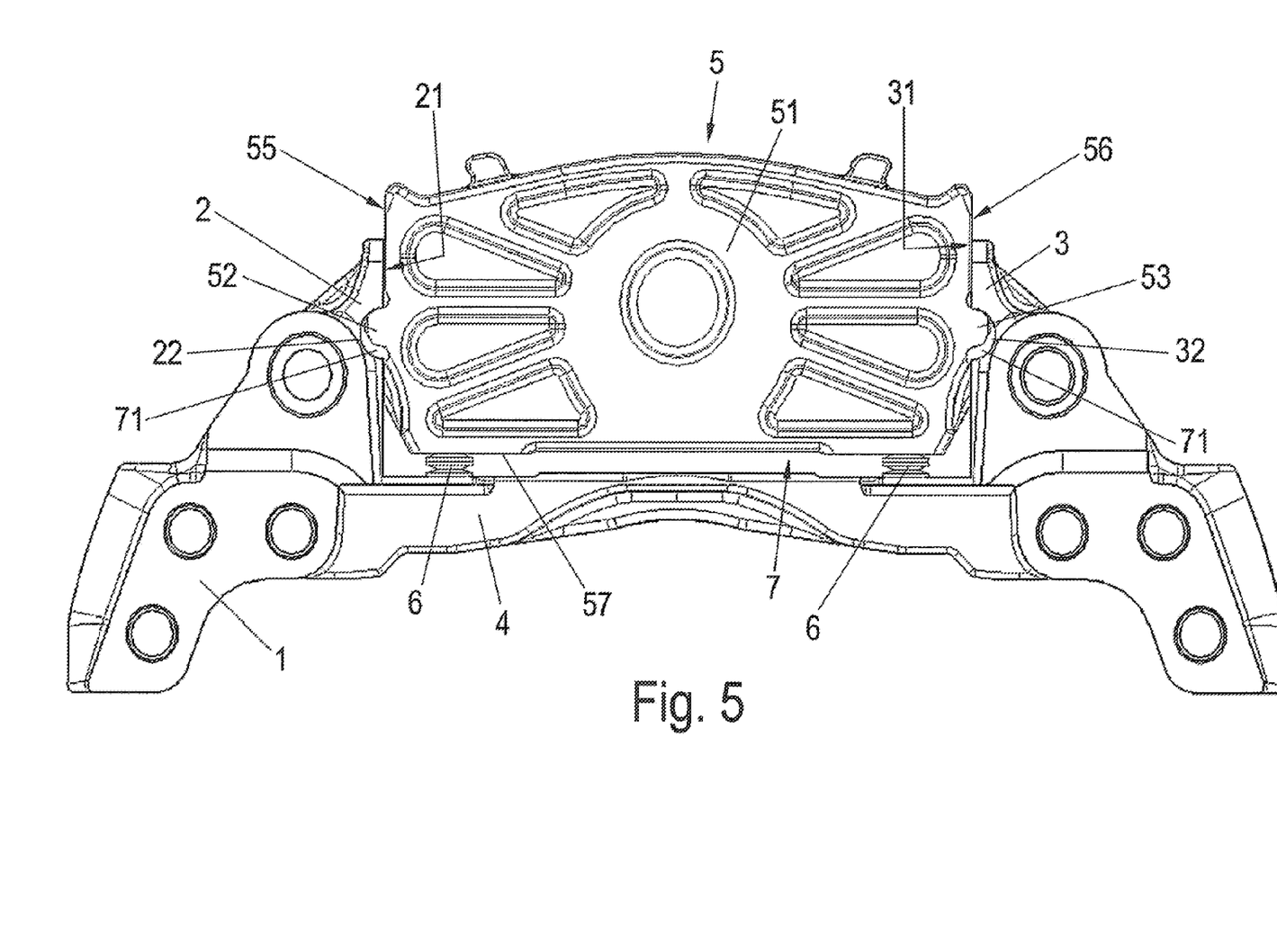

In the embodiment of the pad retention system according to the invention illustrated in FIG. 5, the pad retention spring 6 is constructed in the form of two plate springs which, as in the construction variant shown in FIG. 4, presses from the lower side 57 of the brake pad 5 near the inlet-side edge or near the outlet-side edge thereof in the pad shaft 7 of the brake pad against the upper side of the bridge portion 4 into the positive-locking connection with the carrier horns 2, 3.

Figure 6:
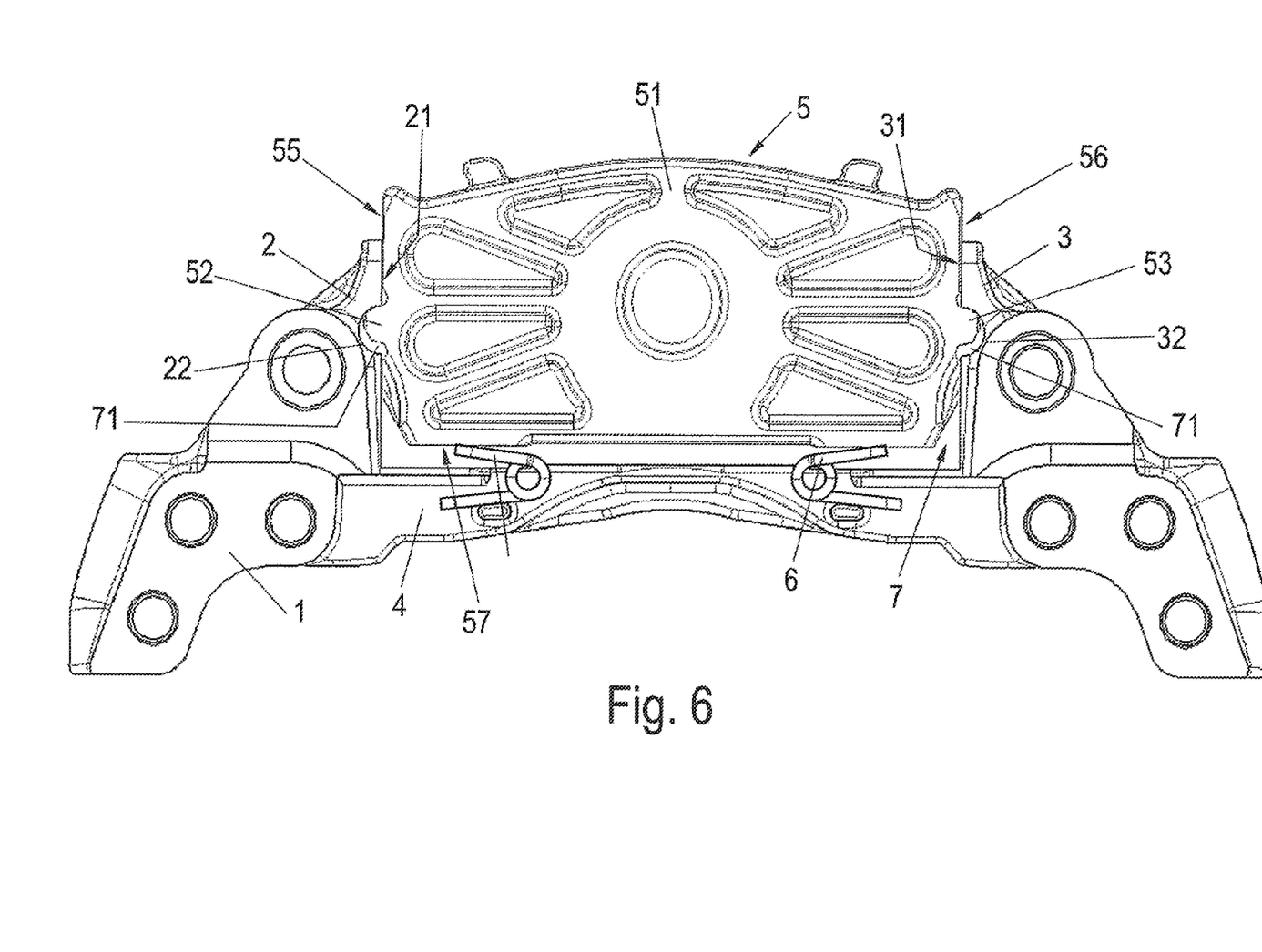

Finally, FIG. 6 shows an embodiment of the pad retention system according to the invention in which the pad retention spring 6 is in the form of a torsion spring which is secured in the bridge portion 4 and which retains the brake pad 5 in the raised position in positive-locking connection with the carrier horns 2, 3.

It is also contemplated to have an embodiment in which the pad retention spring is in the form of a tension spring which is supported on a curved pad retention member 8 secured to the brake caliper, as is shown in the pad retention system according to the prior art shown in FIG. 1.

LIST OF REFERENCE NUMERALS

1 Brake carrier
2 Carrier horn
3 Carrier horn
4 Bridge portion
5 Brake pad
6 Pad retention spring
7 Pad shaft
8 Curved pad retention member
21 Side
22 Recess
32 Recess
51 Brake pad plate
52 Projection 53 Projection
54 Recess
55 Side face
56 Side face
57 Lower side
61 Curved retention member
62 End region of the curved retention member
71 Gap
D Rotation point
D1 Rotation point
$F_F$ Force
$F_R$ Friction force
HDR Main rotation direction
M Torque The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for use with a brake disc, comprising:
   a brake caliper that straddles the brake disc;
   a brake carrier fixable at a vehicle side and having inlet-side and outlet-side carrier horns as well as a bridge portion connecting respective inlet-side carrier horns to respective outlet-side carrier horns;
   at least one brake pad comprising a pad carrier plate and a friction lining secured thereto, the brake pad being guided in a pad shaft formed by the carrier horns and the bridge portion, wherein at least one of the carrier horns of the brake carrier and a support face of the pad carrier plate adjacent thereto are fittable to one another in a positive-locking manner with play; and
   a pad retention spring by which the brake pad is retained in the pad shaft in a resiliently loaded state, the pad retention spring, in an assembled state, pressing the brake pad away from the bridge portion of the brake carrier in a play-free manner against the carrier horns; and
   a curved retention member that is coupled to the pad retention spring, wherein
      the pad retention spring is arranged in the pad shaft between a side of the brake pad facing the bridge portion of the brake carrier and the bridge portion, and
      the pad retention spring is constructed as a leaf spring, which is retained by the curved retention member centrally in a recess that is defined by the pad carrier plate, the recess being located on a side of the pad carrier plate that is adjacent to the bridge portion.

2. The disc brake according to claim 1, wherein the pad retention spring is a tension spring supported on a pad retention member secured to the caliper.

3. The disc brake according to claim 2, wherein the positive-locking manner with play of the support face of the pad carrier plate and an adjacent carrier horn comprises a projection on the support face that extends into an undercut at an inner side of the adjacent carrier horn.

4. The disc brake according to claim 1, wherein the positive-locking manner with play of the support face of the pad carrier plate and an adjacent carrier horn comprises a projection on the support face that extends into an undercut at an inner side of the adjacent carrier horn.

5. The disc brake according to claim 1, wherein the disc brake is a commercial vehicle disc brake.

6. A brake pad retention system for a disc brake having a brake carrier in which, brake pad is mounted in a pad shaft, comprising:
   an inlet-side carrier horn of the brake carrier;
   an outlet-side carrier horn of the brake carrier;
   a bridge portion of the brake carrier connecting the inlet-side carrier horn to the outlet-side carrier horn, wherein the pad shaft is formed by the carrier horns and the bridge portion;
   a pad retention spring arranged in the pad shaft, the pad retention spring being configured to exert a radially outward force on a pad carrier plate of the brake pad; and
   a curved retention member that is coupled to the pad retention spring, wherein
      the pad retention spring is arranged between a side of the brake pad facing the bridge portion and the bridge portion, and
      the pad retention spring is retained by the curved retention member centrally in a recess that is defined by the pad carrier plate, the recess being located on a side of the pad carrier plate that is adjacent to the bridge portion.

7. The brake pad retention system according to claim 6, wherein the pad retention spring is one of a leaf spring, a helical spring, a plate spring, or a torsion spring.

8. The brake pad retention system according to claim 5, wherein one brake pad is respectively arranged on each side of the brake disc in a respective pad shafts of the brake carrier.

9. A disc brake for use with a brake disc, comprising:
   a brake caliper that straddles the brake disc;
   a brake carrier fixable at a vehicle side and having inlet-side and outlet-side carrier horns as well as a bridge portion connecting respective inlet-side carrier horns to respective outlet-side carrier horns;
   at least one brake pad comprising a pad carrier plate and a friction lining secured thereto, the brake pad being guided in a pad shaft formed by the carrier horns and the bridge portion, wherein at least one of the carrier horns of the brake carrier and a support face of the pad carrier plate adjacent thereto are fittable to one another in a positive-locking manner with play; and
   a pad retention spring by which the brake pad is retained in the pad shaft in a resiliently loaded state, the pad retention spring, in an assembled state, pressing the brake pad away from the bridge portion of the brake carrier in a play-free manner against the carrier horns; and
   a curved retention member that is coupled to the pad retention spring, wherein
      the pad retention spring is arranged in the pad shaft between a side of the brake pad facing the bridge portion of the brake carrier and the bridge portion,
      the pad retention spring is disposed in a recess at the side of the pad carrier plate of the at least one brake pad opposite to the bridge portion, and
      the pad retention spring is retained by the curved retention member in a second recess that is defined by the pad carrier plate, the second recess being located on a side of the pad carrier plate that is immediately adjacent to the bridge portion.

10. The disc brake according to claim 9, wherein the retention spring is selected from the group consisting of a leaf spring, a helical spring, a plate spring, and a torsion spring.

* * * * *